INVENTOR.
HARVEY SEGAL
BY
*I. D. O'Brien*
ATTORNEY

United States Patent Office 2,808,847
Patented Oct. 8, 1957

2,808,847
RAPID ACTION SHUT-OFF VALVE

Harvey Segal, Newark, N. J., assignor, by mesne assignments, to the United States of America as represented by the Secretary of the Navy Application June 10, 1954, Serial No. 435,956

1 Claim. (Cl. 137—67)

The present invention relates to valves for fluid flow systems and more particularly to a rapid acting, explosive operated shut-off valve for high pressure fluid flow systems.

Various applications, such as fluid flow systems of certain rockets, require a rapid stoppage of fluid flow through the system upon automatic or remote actuation of the valve. To this end, the present invention provides a valve mechanism wherein a spherical valve member is normally disposed out of the path of fluid flow and is, by means of detonation of an explosive squib through energizing of an electrical firing circuit, caused to move into the fluid stream, the latter moving the spherical valve member into sealing engagement with a valve seat formed on the downstream end of the valve whereby to stop the flow of fluid through the system.

In accordance with the foregoing, an object of the present invention is the provision of an improved explosive operated shut-off valve for use in fluid flow systems.

Another object of the invention is the provision of a single operation, rapid acting shut-off valve for causing sudden stoppage of fluid flow in high pressure fluid flow systems.

A further object of the invention is to provide a fluid flow shutoff valve, as in the foregoing, wherein a spherical valve member is propelled into the fluid stream by detonation of an explosive squib and is moved, by the stream, into sealing engagement with a valve seat formed on the downstream end of the valve.

Figure 1:
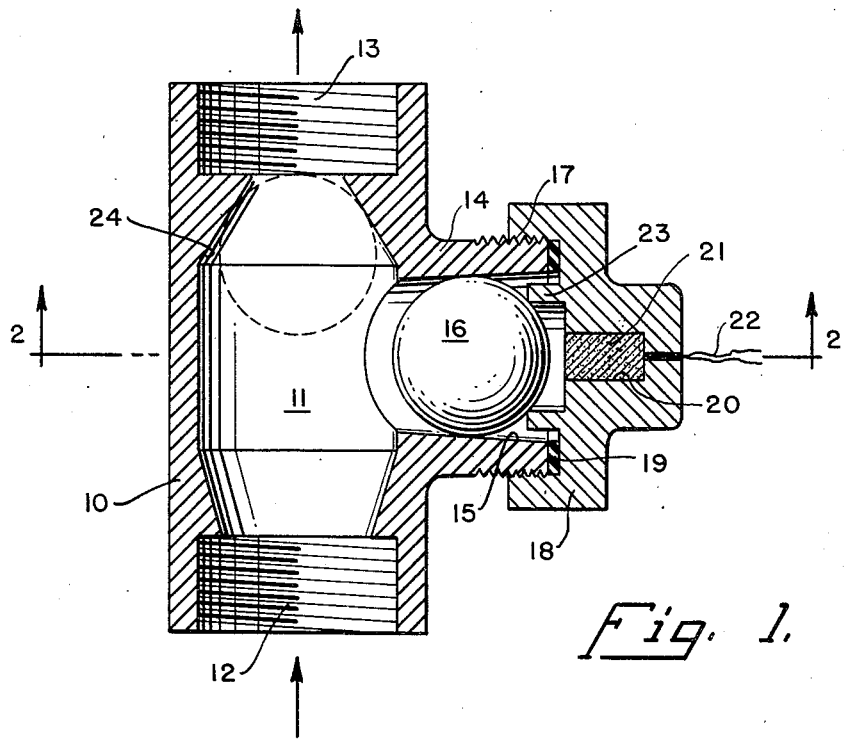
Figure 2:
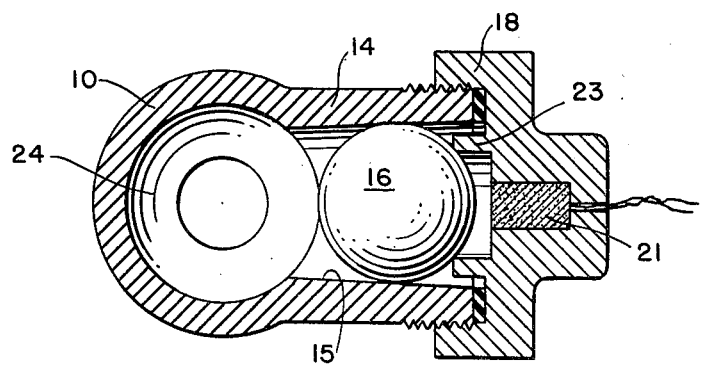

Other objects and many of the attendant advantages of the present invention will become apparent as the same becomes better understood from the following detailed description had in conjunction with the accompanying drawings wherein:

Fig. 1 is a longitudinal cross-sectional view of the shut-off valve of the present invention; and Fig. 2 is a transverse cross-section view taken along the line 2—2 of Fig. 1.

Referring now to the drawing, the valve of the present invention comprises a valve casing 10 including a longitudinally extending passage 11 through which fluid is adapted to flow in the direction indicated by the arrows in Fig. 1. The wall of passage 11 is threaded at its opposite ends, as shown at 12 and 13, whereby to enable the valve to be connected into a fluid flow system. The casing 10 is, intermediate its ends, provided with a laterally extending projection or boss 14 in which is formed a bore 15 communicating with flow passage 11. Bore 15 may be slightly conical, as shown, with its smaller diameter adjacent the passage 11. Disposed in bore 15 is a spherical valve body 16, having a diameter slightly greater than the diameter of the inner end of bore 15 whereby the valve body 16 will be restrained against accidental movement into flow passage 11. The outer end of boss 14 is externally threaded, as at 17, for receiving a threaded cap 18. In order to form a fluid-tight construction, a seal ring 19, of suitable material, is provided between boss 14 and cap 18, as shown. Cap 18 is axially recessed, as shown at 20, for receiving an explosive squib 21 which is adapted to be detonated by the application of electrical current to lead wires 22 extending through cap 18. Cap 18 may, on its inner face, be formed with an annular seat portion 23 against which the spherical valve body 16 is adapted to be urged under the force of fluid acting on valve body 16, during periods of fluid flow through passage 11, whereby to form a fluid-tight seal to prevent leakage of fluid to the squib 21. If desired, the annular seat portion 23 may have a resilient seal ring fixed thereto for engagement with valve body 16 whereby to provide a more efficient fluid seal. Flow passage 11 is, adjacent its downstream end, reduced in diameter whereby to provide a substantially frusto-conical surface 24 which forms a valve seat against which the spherical valve body 16 is adapted to be urged by the fluid stream as will be hereinafter described.

Operation of the present valve is as follows. Fluid flowing through passage 11, in the direction indicated by the arrows in Fig. 1, will act on valve body 16 to urge the latter into sealing engagement with the annular seat portion 23. Valve body 16 may be made of a material which is harder than that of the casing 10 or of a suitable resilient material which will return to its original shape after being slightly deformed whereby upon detonation of squib 21 by the application of an electrical current to lead wires 22, valve body 16 may be propelled into the fluid stream in passage 11, the latter carrying the valve body into sealing engagement with the frusto-conical valve seat 24 with a resultant stoppage of fluid flow through passage 11. In those arrangements wherein valve body 16 is made of a harder material than that of casing 10, the valve body will cause slight expansion of the smaller end of frusto-conical bore 15 upon movement into passage 11 under the force of gases generated by the burning squib 21 while in those arrangements employing a resilient valve body, movement of the latter into the fluid stream will necessitate slight deformation of the body whereby to enable the valve body to move through the reduced end portion of bore 15. After entering the passage 11, however, the valve body will return to its original spherical shape whereby to permit the body to move into sealing engagement with valve seat 24.

Obviously many modifications are possible in the light of the above teachings. Thus, the bore 15 may be of constant diameter and suitable means, such as a resilient O-ring, may be employed for restraining the valve body against accidental displacement into passage 11, the ring, for example, fitting in a groove in the wall of the chamber and resiliently engaging the surface of the valve body. In such an arrangement, the ring could also serve as a seal to prevent the leakage of fluid to the squib. It is therefore to be understood that within the scope of the appended claims the invention may be practiced otherwise than as specifically described herein.

What is claimed is:

A shut-off valve comprising a casing having a fluid flow passage extending therethrough and a substantially frustrum-shaped chamber opening at its smaller end into said passage intermediate the ends of said fluid flow passage, said passage being reduced adjacent its downstream end defining an annular valve seat, a spherical valve body normally disposed in said chamber and having a diameter slightly larger than the diameter of the smaller end of said chamber so that said spherical valve body will be restrained against accidental displacement into said passage, said chamber opening at its larger end to the exterior of said casing, a cap removably secured to said casing for closing the larger end of said chamber, said cap having a recess formed therein which communicates with the interior of said chamber when the cap and casing are assembled, an explosive squib being disposed in said recess, said cap having formed on its inner face an annular seat portion which circumscribes said recess, said spherical valve body being adapted to be urged into fluid-tight engagement with said seat portion by the force of fluid flowing through said passage preventing the leakage of fluid to said explosive squib, said explosive squib in said recess being operative to propel the valve body into said passage so that fluid flowing through the latter will carry the valve body into sealing engagement with said valve seat and stop the flow of fluid through said passage.

References Cited in the file of this patent

UNITED STATES PATENTS

| | | |
|---|---|---|
| 824,933 | Jenczewsky | July 3, 1906 |
| 1,251,489 | Essen | Jan. 1, 1918 |
| 2,215,044 | Kammerdiner | Sept. 17, 1940 |
| 2,467,854 | Ragan | Apr. 19, 1949 |

FOREIGN PATENTS

| | | |
|---|---|---|
| 527,345 | Great Britain | Oct. 7, 1940 |
| 897,567 | France | Mar. 26, 1945 |